Aug. 26, 1958  J. WOOD, JR., ET AL  2,849,262
LUBRICATION METHOD
Filed June 25, 1956
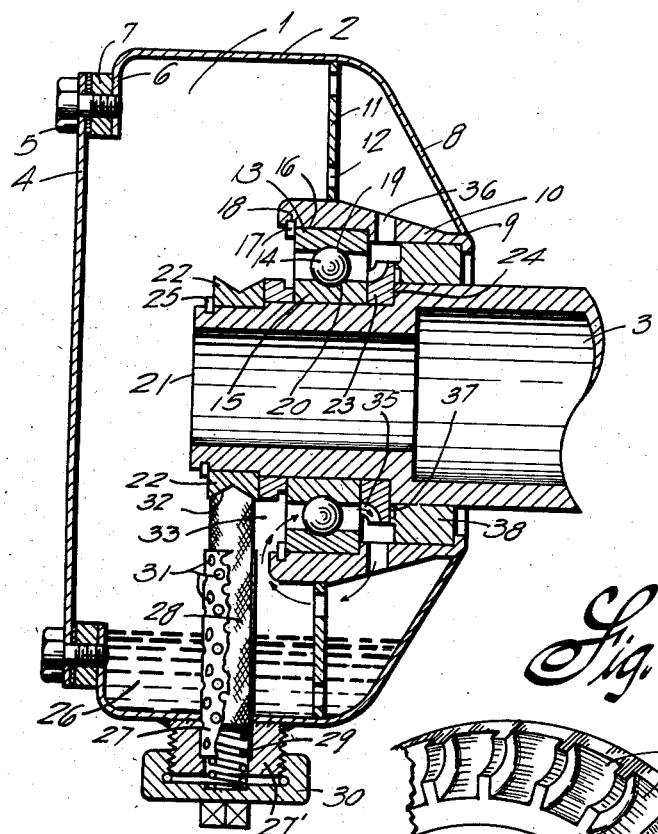
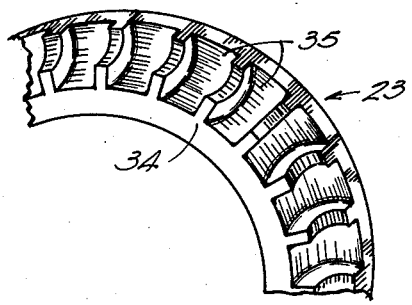
INVENTOR.
JOHN WOOD JR.
PAUL J. BARNICO
BY
ATTORNEYS

United States Patent Office 2,849,262
Patented Aug. 26, 1958

2,849,262

LUBRICATION METHOD

John Wood, Jr., Lynn, and Paul J. Barnico, Beverly, Mass., assignors to the United States of America as represented by the Secretary of the Navy Application June 25, 1956, Serial No. 593,780

1 Claim. (Cl. 308—187)

This invention relates to an oil-mist system for the lubrication of high speed, rolling contact bearings.

A primary problem encountered in the use of rolling contact bearings in high speed rotating equipment is the lubrication of the bearing. Various methods, such as solid oil lubrication, grease packing of the bearings and the use of an oil-mist, have been tried to solve the problem. The oil-mist method has advantages in that it does not require the oil pump, lines, jets, etc. associated with the solid-oil type of lubrication and is not limited in maximum DN value, bearing bore X shaft speed in R. P. M., as are grease packed bearings. This oil-mist method has been used successfully in low-speed bearings.

In a high speed bearing, there is a tendency for the bearing to build up a boundary layer or cushion of air about itself when rotating. Since this boundary layer of air tends to prevent the oil-mist from penetrating the bearing, it is necessary that some positive means be employed to get the lubricating oil-mist to the bearing. Some air-oil-mist systems overcome the problem by pressuring the air and creating an oil-mist that actually impinges on the bearing. However, this pressure system requires the use of pumps, lines, valves and other auxiliary equipment.

The instant invention offers a solution whereby an oil-mist system which requires no auxiliary equipment is employed. The invention makes use of an oil-soaked wick pressing against a rotating slinger to generate an oil-mist and an impeller to draw this mist through the bearing to be lubricated.

It is an object of this invention to provide an oil-mist system for the lubrication of a high speed, rolling contact bearing.

It is a further object of this invention to provide an oil-mist system, which requires no auxiliary pumps, lines or valves, for the lubrication of a high speed, rolling contact bearing.

Other objects and many of the attendant advantages of this invention will be readily appreciated as the same becomes better understood by reference to the following detailed description when considered in connection with the accompanying drawing wherein:

Figure 1 is a view in cross-section showing the various elements of the system.

Figure 2 is a front view of a section of the impeller.

In Figure 1, there is disclosed a hollow housing 1 having cylindrical side walls 2 and rotatably supporting a high speed shaft 3. At one end, the housing 1 is effectively sealed by a cover plate 4 mounted by bolts 5 on a flange portion 6 of the side walls. A gasket 7 forms the seal between the cover plate 4 and the flange 6. At the other end, the housing 1 has a conical wall portion 8 ending in a circular opening 9.

Extending inwardly of the housing 1 from the opening 9 is a somewhat circular support element 10, which is held in position by a circular strengthening rib 11 having perforations 12. The rib 11 is rigidly secured to the inner portion of the side walls 2. The support element is welded to the rib 11 and the conical wall portion 8.

A rolling contact or anti-friction bearing having outer race 13, balls 14 and inner race 15 is mounted in the support element 10. The outer race 13 is press fitted in a cut out portion 16 in the support element and is held in position by a lock washer 17 fitting in the recess 18. The inner surface of the outer race has an arcuate track 19 for reception of the balls 14. The inner race 15 is mounted on the shaft 3 for rotation therewith. An arcuate groove 20 in the outer surface of the inner race 15 receives the balls 14.

Secured to the shaft 3 between the end 21 of the shaft and the inner race ring 15 is a slinger 22. An impeller 23 is mounted on the shaft 3 for rotation therewith between a shoulder 24 on the shaft and the inner race ring 15. A lock washer 25 fitting in a recess in the shaft retains the impeller, the inner race and the slinger in proper position.

When oil is added to the housing 1 which is mounted in a vertical position, an oil reservoir 26 is formed at the bottom of the housing. A hollow tube 27 having a threaded head 27' which is secured to the side wall 2 extends through the oil reservoir 26. Adjustably mounted in the tube 27 is a wick 28 which is urged against the slinger 22 by the spring 29, the tension of which may be regulated by the nut 30. A plurality of openings 31 in the tube 27 permits the oil from the reservoir to wet the wick so that the oil is drawn to the slinger through the wick. A tapered connection 32 between the wick 28 and the slinger 22 generates the oil drawn up through the wick into a fine mist in chamber 33.

In a high speed bearing, the boundary layer of air will prevent the oil-mist in chamber 33 from reaching the bearing. The impeller 24 is mounted on the shaft 3 to draw the oil-mist through the bearing. This impeller consists of the spacer 34, having in one face a plurality of radial slots 35 which draw the oil-mist through the bearing. Openings 36 in the support element 10 allow the oil to return to the reservoir from the impeller. The other face 37 of the spacer bears against the rubbing contact seal 38. Thus, the spacer is used for sealing and oil circulation.

In operation, the wick is impregnated with oil through the openings 31 and from there the oil moves up the wick to the slinger 22. As the shaft 3 is brought up to speed, the friction between the wick 28 and the surface 32 of the slinger combined with the high linear velocities at the point of contact cause the formation of an oil-mist in the chamber 33. The oil-mist is then drawn through the bearing to lubricate it by the action of the impeller 24. The slots in the impeller then direct the oil-mist back to the reservoir through the openings 36. A portion of the oil-mist returns to the chamber 33 through the openings 12. Thus, the bearing is properly lubricated by an oil-mist at all operational speeds.

Obviously many modifications and variations of the present invention are possible in the light of the above teachings. It is therefore to be understood that within the scope of the appended claim the invention may be practiced otherwise than as specifically described.

What is claimed is:

In an oil-mist system for the lubrication of a high speed bearing comprising a housing, a bearing supported in the housing, a shaft mounted in said bearing, a slinger ring mounted for rotation with the shaft adjacent the bearing, an oil reservoir in the housing, means for drawing the oil from the reservoir to the slinger ring whereby an oil-mist is formed adjacent the bearing, said latter means comprising a perforated tube mounted in the oil reservoir, a wick mounted for sliding movement within the tube and a spring for urging the wick against the slinger ring, the combination therewith of the improvement to draw the oil-mist around the bearing so that proper lubrication of the bearing is effected, said improvement including an impeller mounted for rotation with the shaft adjacent the bearing for drawing the oil-mist through the bearing so that the bearing is properly lubricated, a sealing ring for retaining the oil in the housing, said impeller comprising a spacer mounted between the bearing and the sealing ring with a plurality of radial slots in one face of the spacer adjacent the bearing and the other face of the spacer abutting the sealing ring.

References Cited in the file of this patent

UNITED STATES PATENTS

| 1,341,415 | Conklin | May 25, 1920 |
| 1,890,844 | Delaval-Crow | Dec. 13, 1932 |

FOREIGN PATENTS

| 1,101,134 | France | Apr. 13, 1955 |

OTHER REFERENCES

Product Engineering, February 1952, pages 166 and 167.